H. G. BAUMAN AND G. M. WESTERBERG.
COMBINED FLASH AND TROUBLE LAMP.
APPLICATION FILED MAR. 9, 1917.
1,330,974.
Patented Feb. 17, 1920.
2 SHEETS—SHEET 1.
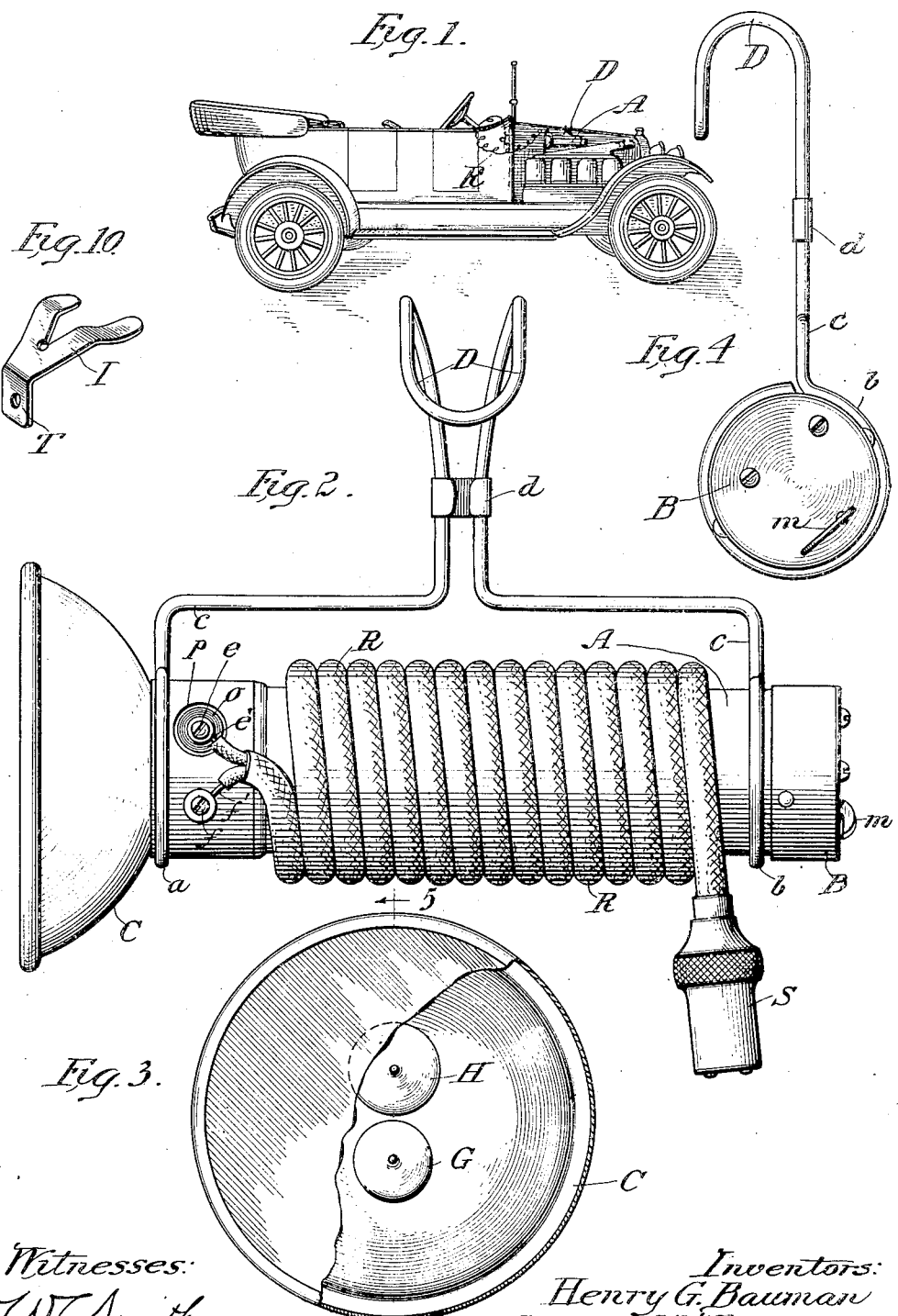
Witnesses:
W. T. Smith
Florence Mitchell
Inventors:
Henry G. Bauman
George M. Westerberg
By Frank D. Thomas, Atty.

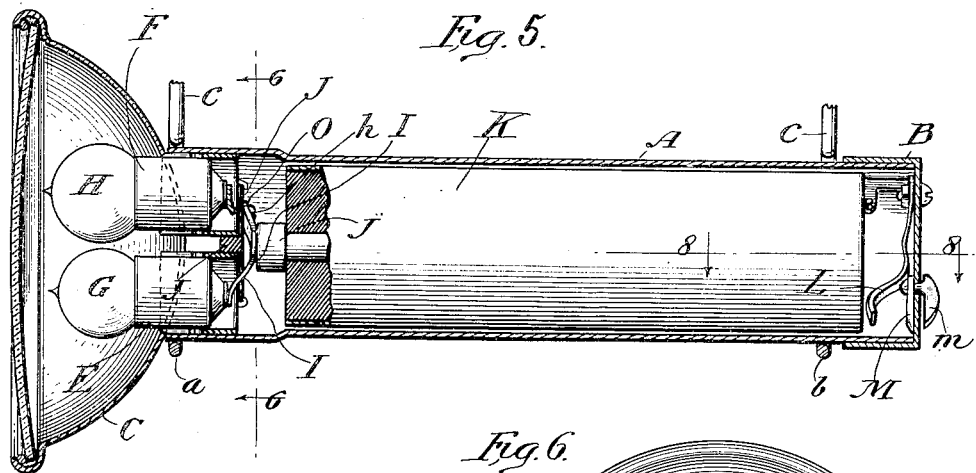
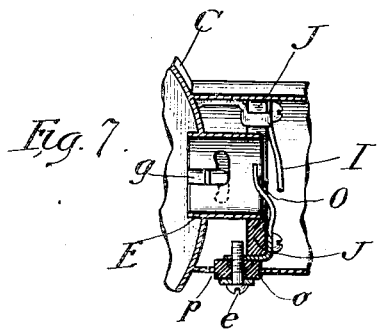
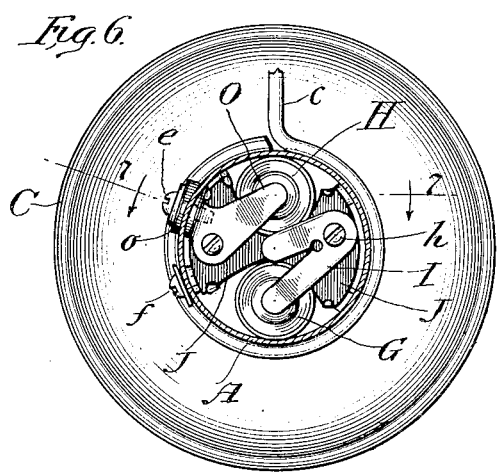
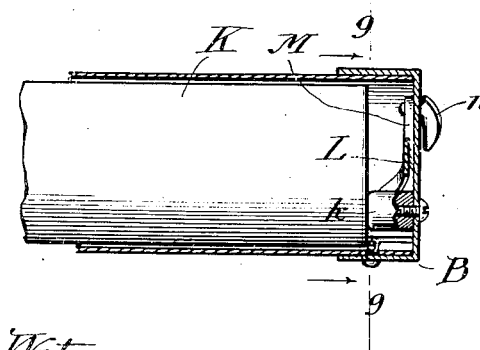
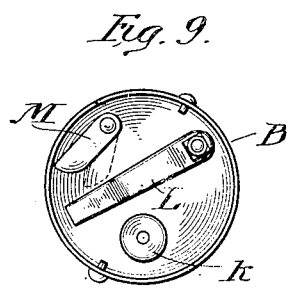

UNITED STATES PATENT OFFICE.

HENRY G. BAUMAN AND GEORGE M. WESTERBERG, OF CHICAGO, ILLINOIS, ASSIGNORS OF ONE-THIRD TO OSCAR ANDERSON, OF CHICAGO, ILLINOIS.

COMBINED FLASH AND TROUBLE LAMP.

1,330,974. Specification of Letters Patent. Patented Feb. 17, 1920.

Application filed March 9, 1917. Serial No. 153,721.

*To all whom it may concern:*

Be it known that we, HENRY G. BAUMAN and GEORGE M. WESTERBERG, citizens of the United States, residing at Chicago, in the county of Cook and State of Illinois, have invented new and useful Improvements in Combined Flash and Trouble Lamps, of which the following is a full, clear, and exact description.

Our invention relates to an electric lamp, and particularly to a lamp for the use of automobilists.

The object of our invention is to provide a combined flash-light and trouble-lamp which is so constructed that the wire extension thereof can be unwound from its rotatable casing and connected in the socket in the dash-board of the automobile or in the lamp-socket of an outside electric light system when it is desired to use the lamp for any considerable length of time, or it can be conveniently held in the hand and used when the extension wire is wound upon the casing, as a flash-light. This I accomplish by the means hereinafter fully described, and as particularly pointed out in the claims.

In the drawings:

Figure 1 is a side view of an automobile showing the application of our invention thereto.

Fig. 2 illustrates a side view of said invention on an enlarged scale.

Fig. 3 illustrates a front end view of the same.

Fig. 4 illustrates a rear end view thereof.

Fig. 5 illustrates a longitudinal section taken on dotted line 5—5, Fig. 3.

Fig. 6 is a transverse section taken on dotted line 6—6, Fig. 5.

Fig. 7 is a longitudinal section of a fragment of our invention taken on dotted line 7—7, Fig. 6.

Fig. 8 is a longitudinal section of the rear portion of the casing taken on dotted line 8—8, Fig. 5.

Fig. 9 is a transverse section taken on dotted line 9—9, Fig. 8, looking in the direction indicated by the arrows.

Fig. 10 is a perspective view of a modified form of an electrical device used in connection with our invention.

Referring to the drawings, A represents the hollow cylindrical casing of an ordinary flash-light, which is closed at its rear end by a cover B and has its front end portion slightly expanded and closed by the rear end of a parabolic reflector C having a circular flange projecting rearwardly from its central portion concentric to its axis. This casing is rotatably mounted in corresponding looped ends $a$ and $b$ of a bail $c$. At a short distance from the casing the ends of this bail are bent toward and aline with each other and when nearly together they are bent correspondingly outward at right angles to the axis of the casing and fastened together by a clip $d$ to form a shank of a hook D into which the return bend of the bail is formed. The forward loop $a$ is retained in place by reflector C and binding-screws $e$ and $f$ (which will hereinafter be more fully explained), and the rear loop $b$ is retained by cover B.

The central portion of reflector C immediately in front of the forward end of the casing is provided with two lamp sockets E and F, each of which is provided with bayonet slots $g$ to permit of the insertion of the stubs of suitable incandescent lamps G and H, which latter are of the usual construction and have single contact points projecting from their rear ends.

The contact projecting from the rear of the stub of lamp G has one arm of a V-shaped metallic brush I normally bearing against the same, and this brush is fastened at the confluence of its arms by a screw $h$ that is tapped into a suitably shaped bridge of insulating material J, which passes between the lamp sockets and connects diametrically opposite sides of the casing. The other arm of said V-shaped brush I is shorter than that which comes in contact with the lamp stud and is bent rearwardly and is in constant yielding engagement with the positive terminal $j$ of the dry battery K that is inclosed within casing A.

This dry battery is kept pushed forward against the yielding arm of brush I by means of a forwardly projecting knob $k$ of insulating material permanently secured to the inner surface of the head of cover B, and thus keeps the battery stationary and prevents its rattling in the casing. Secured at one end in a diametrical position to the inner side of the head of cover B, is an elongated metallic switch L, the unsecured end of which is bent forward to such an extent that when unengaged said switch does not come in contact with the rear metallic end or negative terminal of the battery.

When it is desired to use the flash-light (or lamp G), however, a knife edged oscillating arm M whose pivotal pin is journaled in the head of said cover, is moved by means of a finger-grasp m on the rear end of said pivotal pin between the switch and said head, and forces the forwardly bent end thereof into contact with the rear metallic end of the battery, and connects the same with the metal of the casing.

The contact in the projecting rear end of the stub of lamp H is in constant engagement with a metallic brush O, which latter is secured to bridge J in a position about diametrically opposite to screw $h$, and the end of this brush O farthest from lamp H is extended over the edge of bridge J, and between the same and an insulating washer $o$ and engages the threaded end of a binding-screw $e$. Washer $o$ extends out through a suitable opening $p$ in the side of the casing and the outer end of binding-screw $e$ has the stripped end of one of the wires $e'$ of a two-wired insulated extension cord R secured thereto. The adjacent stripped end of the other wire $f'$ of said insulated cord R is suitably secured to binding-screw $f$ which is tapped into the metal casing adjacent screw $e$.

The extension cord is easily wound upon casing A by merely holding the bail in the hand and revolving the casing by grasping the rear extended end of the casing and turning it, and said cord can be just as easily unwound by pulling on its outer end. A suitable plug S is secured to the outer end of said extension cord, and by moving arm M out from under switch L so as to open the battery circuit and inserting plug C in the socket of the pilot lamp in the dashboard of the automobile, a permanent and more powerful light can be obtained from lamp H. If the automobile is in a suitably equipped garage, plug S could be inserted in a lamp socket of the electric light system and the service electrically utilized to obtain the necessary current to light the trouble lamp.

It is apparent that instead of two lamps one lamp could be used for both the flash-light and the trouble lamp; the only change that would be necessary would be to bring the binding-screw $e$ into contact with brush I, which latter would then have to be provided with an extension T, substantially as shown in Fig. 10 of the drawings.

What we claim as new is:

1. An electric lamp of the kind specified comprising a cylindrical casing, an incandescent lamp insertible in the front end thereof, a battery inclosed within said casing, means electrically connecting said battery and lamp, a bail within the looped ends of which said casing is rotatably mounted, a contact engaging the stub of said lamp, and a two wire insulated extension cord one of the wires of which is connected to said contact and the other to said casing; said extension cord being adapted to be wound and unwound from said casing.

2. An electric lamp of the kind specified comprising a cylindrical casing, an incandescent lamp insertible in the front end thereof, a battery inclosed within said casing, means electrically connecting said battery and lamp, a bail within the looped ends of which said casing is rotatably mounted, and the center of length of which is twisted and formed into a hook.

3. An electric lamp of the kind specified comprising a cylindrical casing, a closure for the front end thereof having outwardly flared portions and a suitable socket for the reception of the plug end of a lamp, a cover mounted on said casing near its rear end, and a bail in the looped ends of which said casing is rotatably journaled between said circumferential flange and cover.

4. An electric lamp of the kind specified comprising a cylindrical casing having a suitable battery chamber therein, a member arranged adjacent to the front end of said chamber having a reflector and a suitable socket for the reception of the plug of a lamp, a cover mounted on the rear end of said casing, a bail in the looped ends of which said casing is rotatably journaled between said cover and the reflector, said reflector being secured to the front end of the casing and having a central opening through which the end of said plug extends, and a two wire insulated cord connected with said lamp and adapted when the casing is rotated to be wound thereon.

5. An electric lamp of the kind specified comprising a cylindrical casing, a closure for the front end thereof the central portion of which has a socket therein for the reception of the plug of a lamp, and has a circular flange projecting rearwardly therefrom which is inserted and retained in the forward end of said casing, a bail in the looped ends of which said casing is suspended and rotatably journaled between said closure and cover, and a two wire insulated cord used in connection with said lamp and adapted when said casing is rotated to be wound thereon.

6. An electric lamp comprising a metallic casing, two incandescent lamps removably connected to the front end thereof, a battery within said casing, means for electrically connecting said battery with one of said lamps, an extension cord one of the wires of which is connected to the other of said lamps and the other wire thereof grounded against the said casing.

7. An electric lamp comprising a metallic casing, two incandescent lamps removably connected to the front end thereof, a cover for closing the rear end of said casing, a battery within the same, yielding means engaged by the terminal in the front end of the battery and connecting the same to one of said lamps, a suitable switch for connecting the rear terminal of said battery to the same, and an extension cord one of the wires of which is connected to the other lamp and the other wire of which is grounded against said casing.

8. An electric lamp comprising a metallic casing, two incandescent lamps removably connected to the front end thereof, a battery within said casing, means for preventing sliding movement of said battery and for electrically connecting said battery with one of said lamps, an extension cord one of the wires of which is connected to the other of said lamps and the other wire thereof grounded against the said casing; said cord being adapted to be wound on said casing, and a bail for rotatively supporting said casing.

9. An electric lamp comprising a metallic casing, two incandescent lamps removably connected to the front end thereof, a cover for closing the rear end of said casing, a battery within the same, yielding means engaged by the terminal in the front end of the battery and connecting the same to one of said lamps, a suitable switch for connecting the rear terminal of said battery to the same, and an extension cord one of the wires of which is connected to the other lamp and the other wire of which is grounded against said casing, said cord being adapted to be wound on said casing, and a bail for rotatively supporting said casing.

10. In a lamp of the class described comprising a cylindrical casing, a battery inclosed in the casing lighting elements arranged at one end of the casing one of which has a connection with the battery, a bail within the looped ends of which the casing is journaled, a flexible conductor having a connection with the other lighting element arranged in the casing and having a plug provided upon the opposite end thereof, said flexible conductor being permitted to be wound and unwound from the casing when same is rotated with relation to the bail.

In witness whereof we have hereunto set our hands and seals this 27th day of February, 1917.

HENRY G. BAUMAN.
GEORGE M. WESTERBERG.

Witnesses:
   FRANK D. THOMASON,
   FLORENCE MITCHELL.